US006912478B1

(12) United States Patent
Face, III

(10) Patent No.: US 6,912,478 B1
(45) Date of Patent: Jun. 28, 2005

(54) SYSTEM FOR COLLECTING DATA USED BY SURFACE PROFILING SCHEME

(75) Inventor: S. Allen Face, III, Wilmington, NC (US)

(73) Assignee: Allen Face and Company, LC, Wilmington, NC (US)

(*) Notice: Subject to any disclaimer, the term of this patent is extended or adjusted under 35 U.S.C. 154(b) by 0 days.

(21) Appl. No.: 10/639,554

(22) Filed: Aug. 12, 2003

(51) Int. Cl.[7] .................................................. G01B 5/20
(52) U.S. Cl. ......................... 702/165; 33/523; 73/105; 702/167
(58) Field of Search ................................. 702/158, 163, 702/165, 167; 33/523, 533, 556, 572; 73/105; 346/8

(56) References Cited

U.S. PATENT DOCUMENTS 3,056,209 A    10/1962  Oliver ........................ 33/523
4,403,419 A *  9/1983  Graves ........................ 33/523
5,535,143 A    7/1996  Face ........................... 702/165

* cited by examiner

Primary Examiner—John Barlow
Assistant Examiner—John Le
(74) Attorney, Agent, or Firm—Peter J. Van Bergen

(57) ABSTRACT

A system is provided for the collection of measurements for use by a surface profiling processing scheme. A movable platform is equipped to: (i) generate a measurement of inclination of a surface when the platform is and stationary thereon, (ii) generate measurements of surface curvature as the platform traverses the surface, (iii) monitor distance that the platform traverses during a measurement run, (iv) generate a signal each time the platform traverses a predetermined amount of distance during a measurement run where the signal is such that the user is alerted to stop the platform, (v) collect measurements of curvature while the platform traverses the surface, and (vi) collect measurements of inclination at the starting position, stopping position, and each time the platform is stopped during the measurement run.

62 Claims, 5 Drawing Sheets

SYSTEM FOR COLLECTING DATA USED BY SURFACE PROFILING SCHEME

CROSS-REFERENCE TO RELATED PATENT APPLICATIONS

This patent application is co-pending with one related patent application entitled "MOVABLE PLATFORM FOR USE WITH SURFACE PROFILING SYSTEM", filed on the same day and by the same inventor as this patent application.

1. Field of the Invention

The invention relates generally to surface profiling systems, and more particularly to a system for collecting data measurements that are used by a surface profiling processing scheme.

2. Background of the Invention

Rolling surface profiling apparatus have been used for some time to measure the profile or contour of a material surface, floor, road, etc. For example, U.S. Pat. No. 3,056,209 issued to Robert E. Oliver on Oct. 2, 1962, discloses a three-wheel, continuous recording, analog computation device that endeavors to accurately measure the contours of a surface with respect to a reference plane by the use of a "floating" center wheel which produces a vertical displacement signal with respect to the distance traveled over the surface by a double integration procedure. Equations 1 through 4 in the Oliver patent describe the geometrical and mathematical relationships between the measured and desired quantities that make such a device theoretically possible. However, the reference notes that it is necessary to consider stability problems and proceeds to change the ideal coefficients given in Equation 4 to certain values which the patentee found, through experience, to yield satisfactory results. The patentee justifies the abandonment of the ideal mathematical model as necessary to overcome serious problems of noise compounding that is inherent in all such integration devices.

A three-wheel rolling digital surface measurement apparatus is disclosed by Allen Face in U.S. Pat. No. 5,535,143. Similar to the Oliver patent, three collinear, sequentially oriented, regularly spaced and approximately equi-diameter wheels are provided on one side of a measurement platform. The middle wheel is a floating wheel having a linear position transducer coupled thereto. The rear wheel has an odometer coupled thereto. On-center spacing between each adjacent pair of wheels is given as S.

More specifically, the device of U.S. Pat. No. 5,535,143, illustrated schematically in FIG. 1, includes a rigid frame 2 rotatably supporting a rear wheel 3 and a front wheel 4 that are co-linear and separated by the distance 2S. Support wheels 3 and 4 contact the measured surface 1 at points i and i–2, respectively. Midway between support wheels 3 and 4, a sensing wheel 5 is in contact with surface 1 at point i–1. Sensing wheel 5 supports an axially movable column 6 that is connected to frame 2 in such a manner that its movement relative to frame 2 is restricted to an axis normal to the line joining the centers of wheels 3 and 4. A linear position transducer 7 having an output signal R is mounted on frame 2 in such a manner that its electrical output is directly proportional to the position of column 6 relative to frame 2. An odometer 8 is mounted on frame 2 to produce an electrical signal D that is directly proportional to the distance traveled by rear wheel 3 across surface 1. The linear position transducer signal R and odometer signal D are both input to a digital computer 9 which is programmed to interpret the two signals and record the instantaneous position, in convenient dimensions, of column 6 relative to frame 2 every time rear wheel 3 travels the distance S across surface 1. All of the above named individual components, as well as the electrical powering apparatus (not shown) required for the apparatus, are commercially available items. Similarly configured surface curvature measurement devices have long been known to those skilled in the art.

In accordance with the teachings of U.S. Pat. No. 5,535,143, each wheel contacts the measured surface at that point where the tangent to the wheel and the tangent to the surface coincide. Due to the undulation of the measured surface, the line connecting the center of each wheel and its associated contact point will rarely be perpendicular to the elevation datum. While the computer of this invention assumes that every reading point will fall on a normal from the wheel center to the elevation datum, in actuality, most of the reading points will be slightly displaced from the assumed position owing to the wheel surface contact geometry.

The computer of this invention records the column position transducer signal at the instant the odometer indicates that the rear wheel has traveled the distance S. However, between successive reading points, the rear wheel is not traveling in a straight line, but along an undulating surface. Thus, while the computer assumes that the horizontal displacement between successive readings is the constant distance S, in actuality the straight line distance between each successive reading will vary slightly according to the length of the undulating surface profile over which the real wheel travels. Thus, odometer triggering results in a slightly variable reading point spacing as the sensor wheel and front wheel contact points at one reading position will rarely coincide exactly with the rear wheel and sensor wheel contact points at the next reading position.

"Curvature" readings in both of the above-described surface profiling systems/schemes (as well as other similar prior art surface profiling schemes) are subject to measurement errors. Furthermore, the "curvature" readings must be double integrated in order to obtain the desired evation profile of the surface. However, the nature of the double integration process causes any attendant measurement errors to be amplified in direct proportion to the square of the distance traveled. This inherent error squaring aggregates quickly and overwhelms the elevation calculation even when individual measurement errors are minute.

SUMMARY OF THE INVENTION

Accordingly, it is an object of the present invention to provide a system that can collect data for use by a surface profiling scheme.

Another object of the present invention to provide a system that collects data for use by a surface profiling scheme where the data collected can be used to reduce errors in the surface profiling scheme's calculations.

Other objects and advantages of the present invention will become more obvious hereinafter in the specification and drawings.

In accordance with the present invention, a system is provided for the collection of measurements for use by a surface profiling processing scheme. A movable platform has first means mounted thereon for generating a measurement of inclination of a surface where the movable platform is positioned and stationary thereon. Second means are mounted to the movable platform for generating measurements of curvature of the surface as the movable platform traverses the surface. Third means are provided for monitoring distance that the movable platform traverses during a measurement run in the surface. A measurement run is defined by starting and stopping positions on the surface that are spaced apart from one another. A signal is generated by the third means each time the movable platform traverses a predetermined amount of distance during a measurement run. The signal so-generated serves as an indication to stop the movable platform during the measurement run. Fourth means, coupled to the first and second means, collect (i) measurements of curvature while the movable platform traverses the surface during the measurement run, and (ii) measurement of inclination at the starting position, stopping position, and each time the movable platform is stopped during the measurement run.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 2:
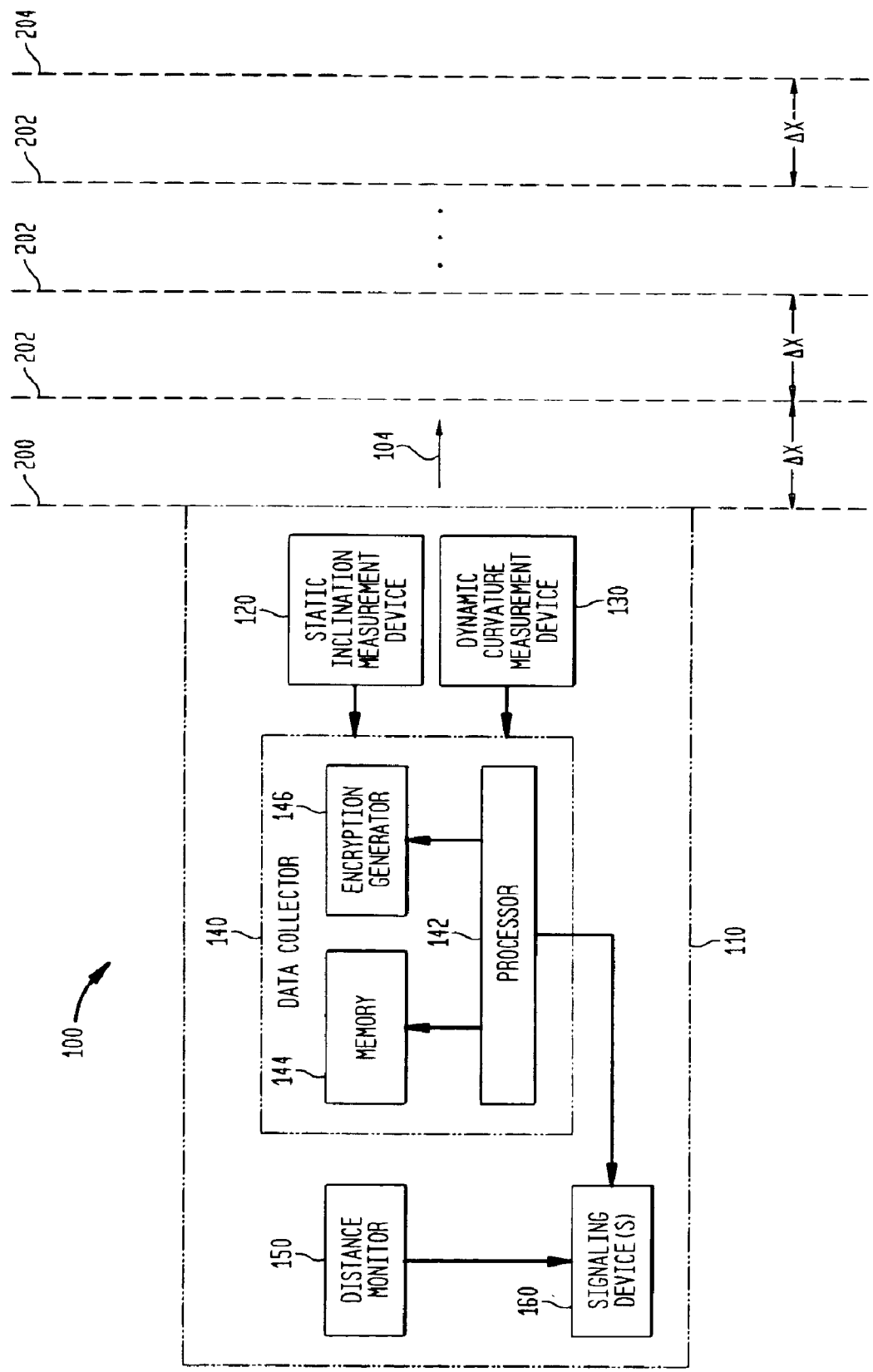
FIG. 2 is a schematic plan view of a system for collecting data in accordance with an embodiment of the present invention where the data collected can be used by a surface profiling scheme.
Figure 4:
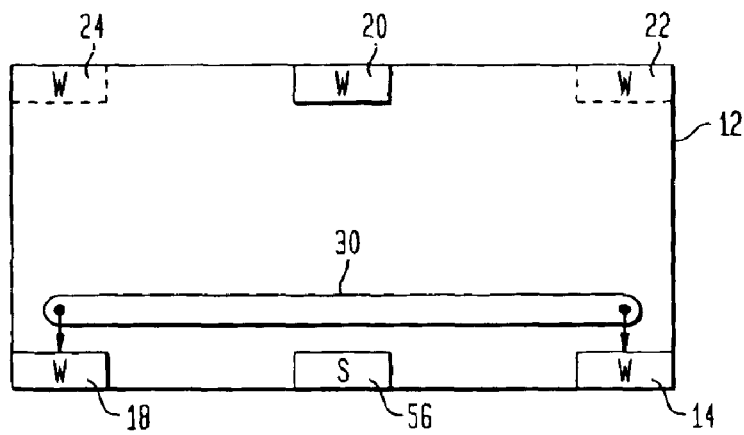
FIG. 4 is a schematic plan view of the underside of the movable platform illustrating another embodiment of its support system.

Referring now to the drawings, and more particularly to FIG. 2, a plan view of a system for collecting data in accordance with the present invention is referenced generally by numeral 100. System 100 is positioned on a surface 102 (e.g., floor, road, or other surface that is to have its surface contour profiled). The data collected by system 100 can be used by a surface profiling scheme that will typically be incorporated into a processor (not shown) which is coupled to system 100 (e.g., hardwired, wirelessly coupled, etc.) to facilitate data transfer therebetween. As will be understood by one of ordinary skill in the art of surface profiling, system 100 can be used by a variety of surface profiling schemes and is, therefore, not limited by the choice of such scheme. For example, either of the afore-described surface profiling schemes disclosed in U.S. Pat. Nos. 3,056,209 and 5,535,143 could utilize data collected by system 100 to reduce the errors inherent in these schemes. It is to be further understood that system 100 can supply data for any profiling scheme used to generate "F-numbers" in accordance with the methods set forth by the American Society for Testing and Materials (ASTM) in ASTM E-1155.

System 100 includes a movable platform 110 having a support system (not illustrated in FIG. 2) coupled to the underside thereof for supporting itself and the remaining components of system 100 on a surface 102. Movable platform 110 supports a static inclination measurement device 120, a dynamic curvature measurement device 130, a data collector 140 coupled to each of devices 120 and 130, a distance monitor 150, and one or more signaling devices 160 coupled to distance monitor.

Static inclination measurement device 120 is any device or system that can measure the slope or inclination of surface 102 as an indication of surface elevation changes where movable platform 110 resides when movable platform 110 is stationary. For example, static inclination measurement device 120 could be a simple capacitance or electro mechanical inclinometer, both of which are well known in the art. Such inclinometers have an axis of sensitivity that should be aligned with what will be the direction of travel of movable platform 110 which, in FIG. 2, is represented by arrow 104.

Dynamic curvature measurement device 130 is any device or system that can take measurements indicative of the changing contour/curvature of surface 102 as movable platform 110 traverses surface 102 along direction of travel 104. This can be done in an analog fashion as disclosed in U.S. Pat. No. 3,056,209, or in a digital fashion as disclosed in U.S. Pat. No. 5,535,143. Details of a digital version of dynamic curvature measurement device 130 will be provided later below.

Data collector 140 is any device or system that can "collect" data samples from each of devices 120 and 130 at the appropriate times. That is, once activated, data collector 140 collects measurement data from device 120 when movable platform 110 is stationary and collects measurement data from device 130 when movable platform 110 traverses surface 102. Realization of data collector 140 can be achieved in a variety of ways as would be well understood by one of ordinary skill in the art. For example, data collector 140 could comprise a processor 142 and memory 144 where processor 142 controls data collection and memory 144 provides for the storage of the data. Note that processor 142 could also have a surface profiling scheme programmed therein for processing the measurement data to develop/calculate surface profile measurements of surface 102. The surface profile measurements can be stored in memory 144 for later output.

Data collector 140 could also include an encryption generator 146 for generating an encrypted form of the surface profile measurements generated by processor 142. In this way, both plain text and encrypted versions of the surface profile measurements can be provided with the encrypted version (once it is decrypted) serving as a means to verify the authenticity of the plain text surface profile measurements. Some or all of the surface profile measurements can be encrypted in accordance with ways well understood in the art of cryptography. Accordingly, the type of encryption used is not a limitation of the present invention.

Distance monitor 150 is any device or system that, once activated, can (i) track or monitor the lineal distance that movable platform 110 travels on surface 102 along direction travel 104, and (ii) generate a signal each time movable platform 110 traverses some predetermined amount of distance. The predetermined amount of distance Δx can be preprogrammed or could be provided as a user input. A variety of mechanical and/or electrical types or devices/systems can be used to accomplish these functions. For example, as will be explained further below, if movable platform 110 is supported by at least one wheel (not shown) contacting surface 102, an odometer can be coupled to the wheel with the odometer's output being monitored by a processor. Note that the processor used to accomplish this function could be the same one forming part of data collector 140.

The signal generated by distance monitor 150 is input to signaling device(s) 160 which produces one or more of a visual, audible and tactile alarm each time the signal is generated by monitor 150. That is, one or more alarms are generated each time movable platform 110 travels a predetermined distance following the activation of distance monitor 150. A visual alarm could be realized by one or more lights that are turned on, flashed on/off, etc. An audible alarm can be realized by a buzzer, beeper, synthetic voice etc. A tactile alarm can be realized by a vibrating device worn or held by a user of system 100.

Use of system 100 will now be explained with continued reference to FIG. 2. When surface 102 is to be profiled, system 100 is placed thereon at a position that will define the starting position of a particular measurement run. In the illustrated example, the starting position is designated by dashed line 200. When a measurement run is to begin, the user activates the various elements of system 100 which are initialized to a start-up state. With system 100 stationary at starting position 200, static inclination measurement device 120 measures the inclination of surface 120 at that location along what will be direction of travel 104. Measurement of inclination occurs along direction of travel 104 because the axis of sensitivity of device 120 was aligned with the moving direction of movable platform 110.

To insure that device 120 has a sufficient amount of time to get an accurate reading of surface inclination, data collector 140 can incorporate a timing function that triggers signaling device(s) 160 to indicate to a user that movable platform 110 can be moved. Such a timing function could be re-started each time system 100 is stopped during a measurement run as will be explained below.

After the static inclination measurement is taken at position 200, a user moves (e.g., pulls) movable platform 110 on surface 102. As platform 110 traverses surface 102, data collector 140 collects equi-spaced curvature measurements taken by dynamic curvature measurement device 130. When distance monitor 150 determines that predetermined distance Δx has been traveled along direction of travel 104, a signal is generated by distance monitor 150 and passed to signaling device(s) 160. The visual, audible and/or tactile alarms produced by signaling device(s) 160 serve as an indication to the user to stop movable platform 110 at an interim static measurement position 202. Once system 100 is stopped, data collector 140 again collects a static surface inclination measurement from device 120. Each time system 100 is stopped, the two most recent static inclination measurements are used to correct the inherent errors associated with the double integration of the dynamic curvature measurements collected over the most-recently traveled distance Δx.

After the static inclination measurement is complete (e.g., as indicated by signaling device(s) 160), system 100 is moved again along direction of travel 104. As system 100 moves, dynamic curvature measurements are again collected by data collector 140. When platform 110 has once again traveled the distance Δx , distance monitor 150/signaling device(s) 160 cooperate to produce another indication for the user to stop movable platform 110 for a static inclination measurement. System 100 is operated in this fashion for the entirety of a desired measurement run which terminates at a selected stopping position 204. After the last static inclination measurement is collected at stopping position 204, system 100 is deactivated to terminate the measurement run. The collected data measurements can be processed by an on-board or remote surface profiling scheme known in the art.

Figure 1:
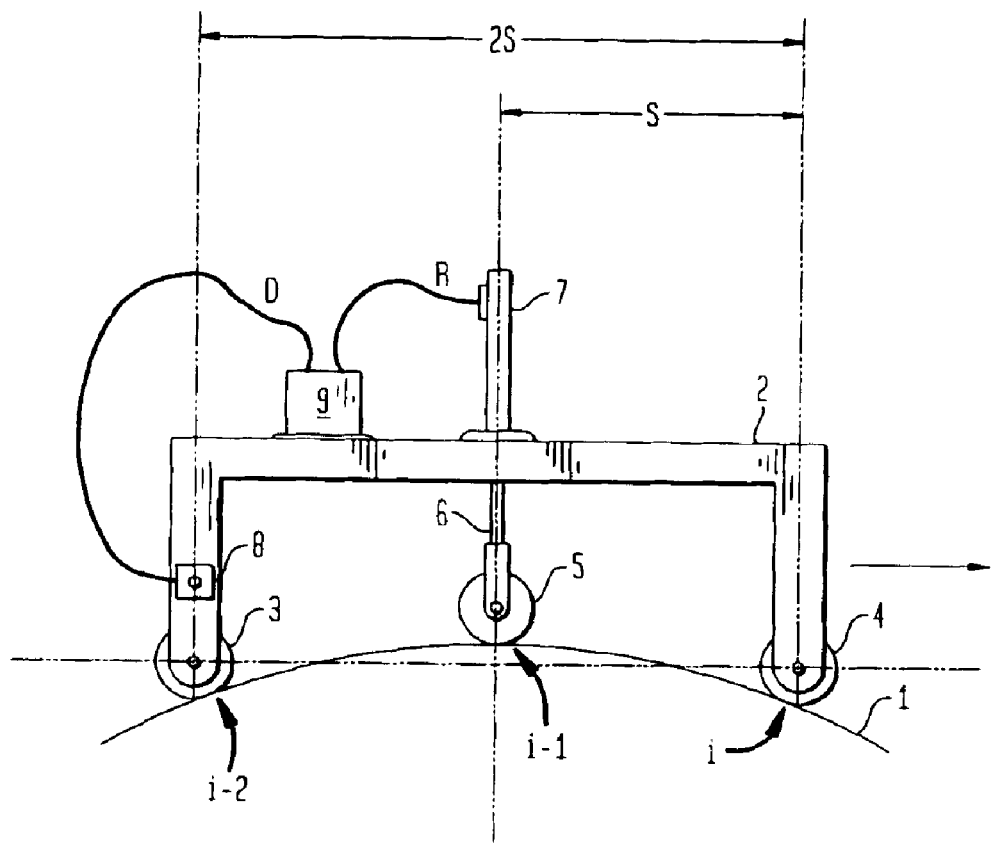
FIG. 1 is a schematic view of a prior art rolling digital surface profiling apparatus.
Figure 3:
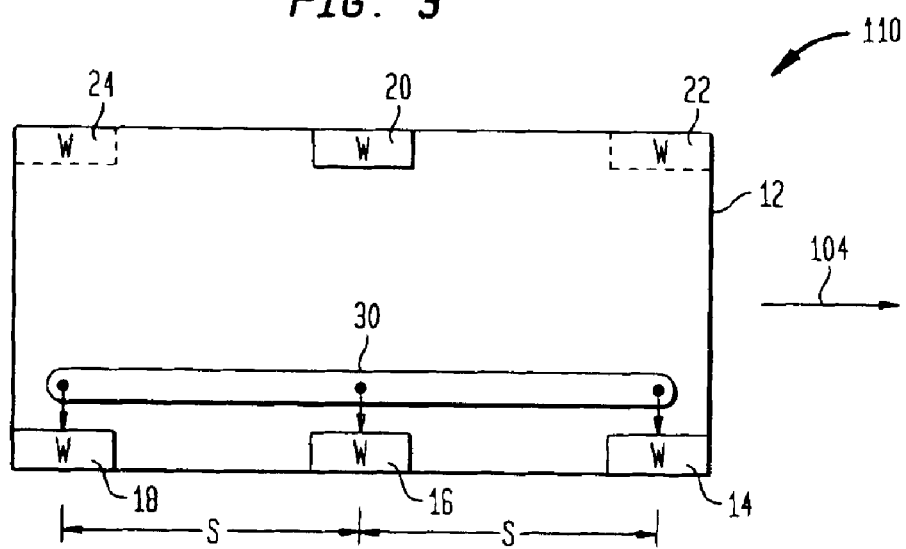
FIG. 3 is a schematic plan view of the underside of a movable platform illustrating one embodiment of its support system.

As mentioned above, system 100 can be realized in a variety of ways. For example, a variety of embodiments of movable platform 110 are illustrated from the underside thereof schematically in FIGS. 3–7. In FIG. 3, movable platform 110 has a frame 12 supported by a plurality of support wheels to include at least four wheels 14, 16, 18 and 20, each of which is indicated by a "W". Wheels 14, 16 and 18 are three co-linearly arranged wheels with wheel 16 centered between wheels 14 and 18 and separated from each of wheels 14 and 18 by a distance S. Wheels 14, 16 and 18 are aligned rotationally to define the above-described linear direction of travel 104 when movable platform 110 is moved on a surface. Center wheel 16 is further configured to move vertically (i.e., into and out of the page for the view illustrated in FIG. 3) or substantially vertically in coincidence with the contour of the surface on which movable platform 110 rests. For example, wheel 16 could be coupled to frame 12 using an axially movable column or piston (not shown) with a linear position transducer coupled thereto as used in U.S. Pat. No. 5,535,143, the contents of which are hereby incorporated by reference. Wheels 14 and 18 are constrained from such vertical movement.

Spaced apart from co-linearly arranged wheels 14, 16 and 18 is at least one wheel 20 which is also aligned for rotation that is coincident with direction of travel 104. Wheel 20 is provided to balance movable platform 110. Wheel 20 could also be replaced or supplemented with additional wheels such as wheels 22 and 24 illustrated in phantom. Each of the above-described wheels is rigid and typically has a solid rubber tire mounted thereon for contacting a surface.

To eliminate errors associated with wheel size differences, wheels 14, 16 and 18 can be coupled to one another such that their rotational movement is synchronized. That is, one full rotation of wheel 14 translates into one full rotation of each of wheels 16 and 18 irrespective of any size differences between the wheels. Such synchronized rotational movement is illustrated schematically by an endless loop 30 coupled to each of wheels 14, 16 and 18. In implementation, such synchronization can be realized in a variety of ways (e.g., geared wheels with a chain coupling the gears, wheels belted together, etc.) as described in the afore-referenced co-pending patent application.

Figure 5:
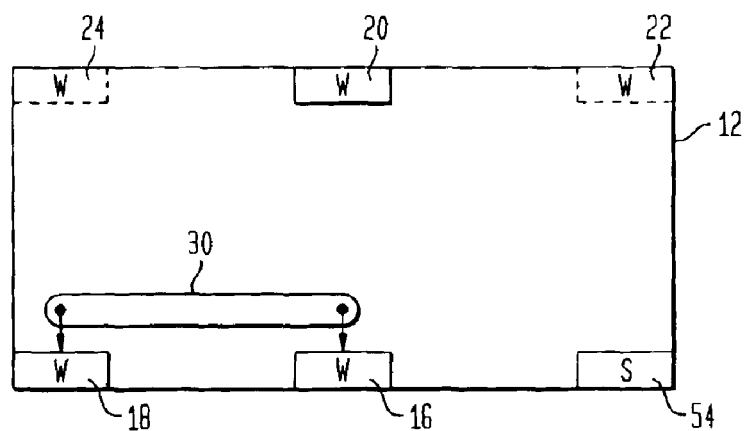
FIG. 5 is a schematic plan view of the underside of the movable platform illustrating still another embodiment of its support system.
Figure 6:
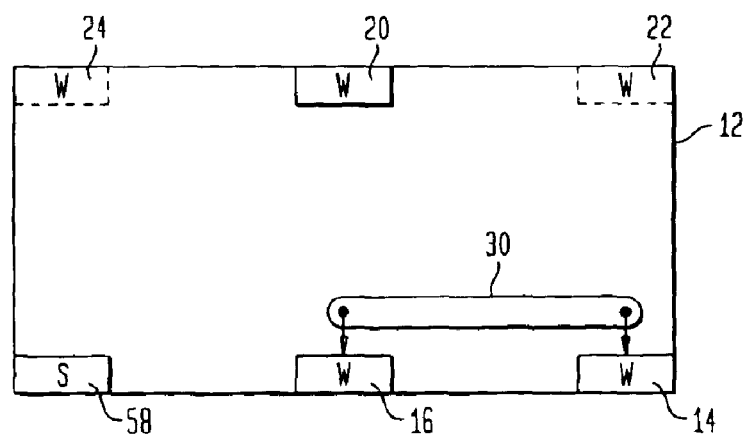
FIG. 6 is a schematic plan view of the underside of the movable platform illustrating yet another embodiment of its support system.
Figure 8:
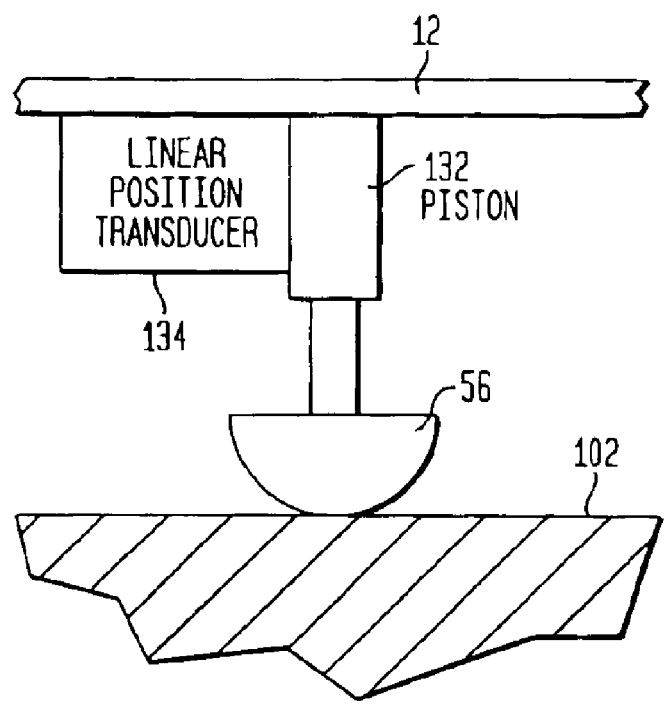
FIG. 8 is an isolated side view of a slide used for the center one of the co-linearly aligned supports illustrated schematically in FIG. 4.

Movable platform 110 is not limited to the use of three co-linearly aligned wheels 14, 16 and 18. For example, in each of FIGS. 4–6, one of the co-linearly aligned wheels is replaced with a support "S" that slides on the surface on which the movable platform rests. For example, in FIG. 4, center wheel 16 (FIG. 3) has been replaced with a slide 56 that slides on the surface as wheels 14 and 18 are rolled thereover. In this case, only wheels 14 and 18 are synchronized by endless loop 30. By way of example, slide 56 can be realized as illustrated in FIG. 8 where a semi-circularly shaped slide 56 is coupled to frame 12 by a piston 132 that allows slide 56 to move vertically in coincidence with the contour of surface 102. A linear position transducer 134 can be coupled to frame 12 for measuring vertical movement of slide 56 via the vertical movement of piston 132. The surface of slide 56 contacting surface 102 should present a durable low-friction interface. Examples of suitable materials include ceramics, carbides, etc. In FIGS. 5 and 6, wheels 14 and 18 are replaced with slides 54 and 58, respectively, with a synchronization of the remaining two of the co-linearly aligned supports being indicated by endless loop 30. Construction of slides 54 and 58 can be similar to that of slide 56.

Figure 7:
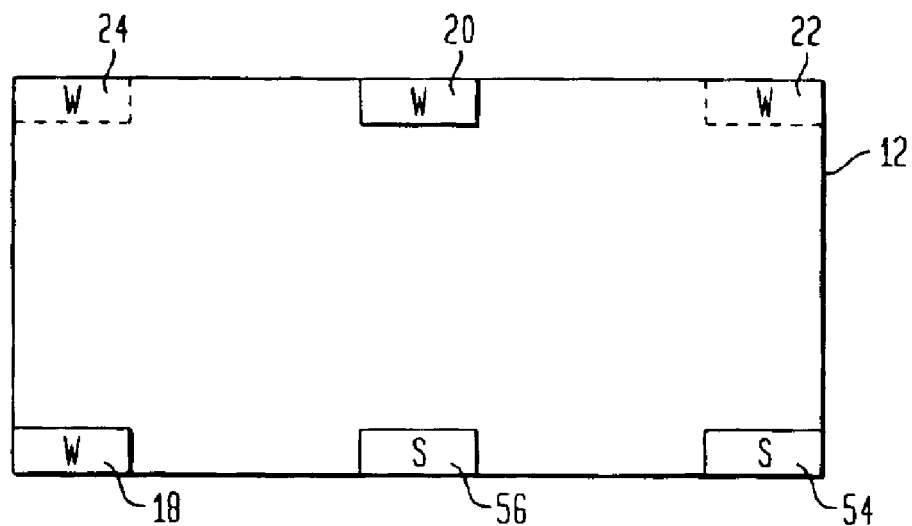
FIG. 7 is a schematic plan view of the underside of the movable platform illustrating yet another embodiment of its support system.

Another embodiment of a support system for movable platform 110 is illustrated in FIG. 7 where wheels 14 and 16 are replaced with slides 54 and 56, respectively, thereby leaving only one wheel 18 in the co-linear arrangement of supports. This embodiment eliminates the errors associated with wheel size differences without requiring apparatus for the above-described wheel synchronization.

Figure 9:
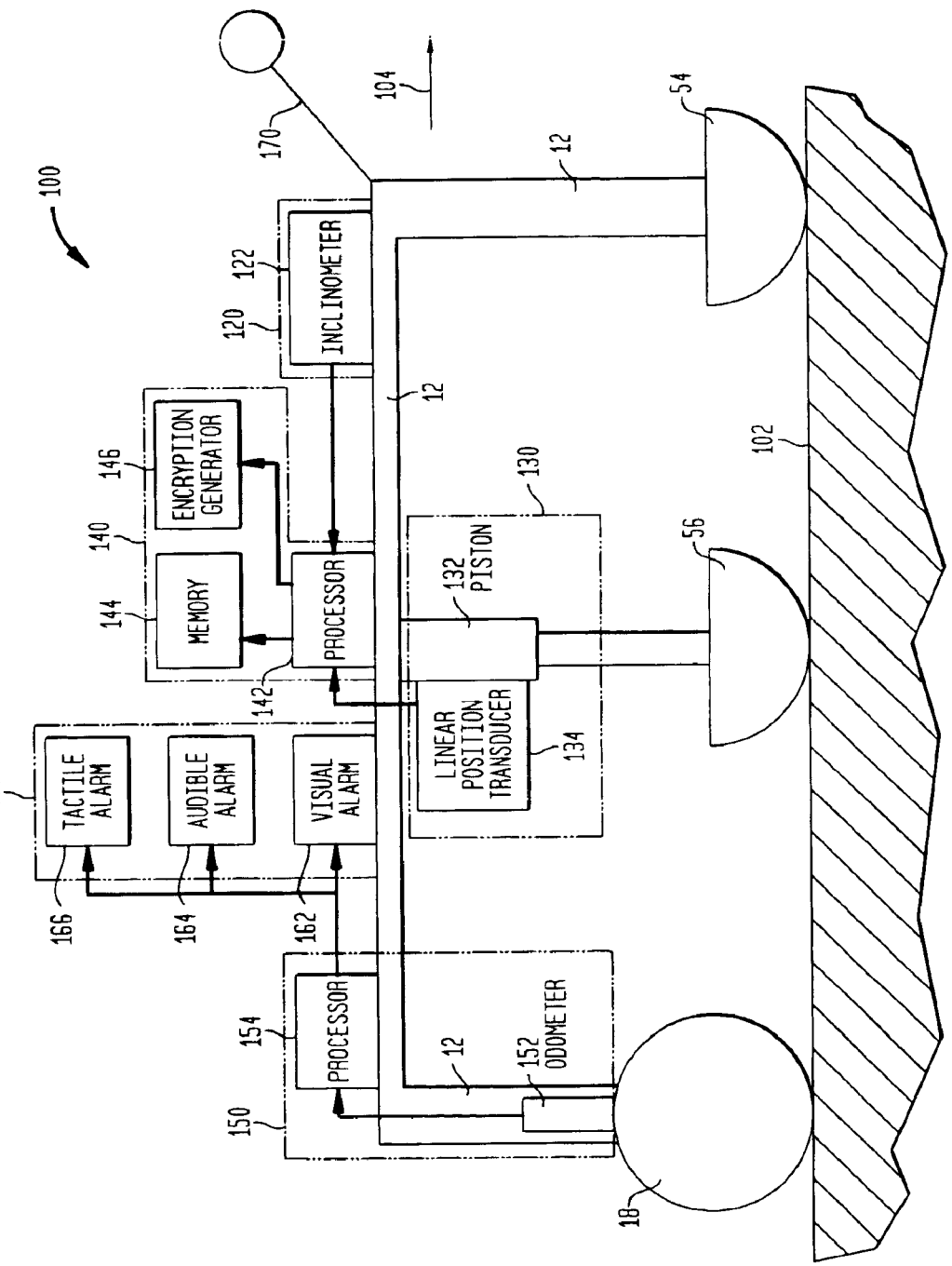
FIG. 9 is a schematic side view an embodiment of the present invention using the movable platform support system illustrated in FIG. 7.

Regardless of the embodiment of movable platform 110, measurement devices 120 and 130, data collector 140, distance monitor 150, and signaling device(s) 160 will be supported thereon. By way of example, one embodiment of system 100 is illustrated in FIG. 9 which is based on the movable platform construction illustrated in FIG. 7. Movement of frame 12 is facilitated by a leash 170 that is coupled thereto and used to pull frame 12 on surface 102. An inclinometer 122 is mounted on frame 12 with its axis of sensitivity aligned parallel to the line defined by the co-linear arrangement of slides 54/56 and wheel 18. Inclinometer 122 is coupled to a processor 142 of data collector 14U as described above.

Measurement device 130 utilizes linear position transducer 134 to read the vertical position of piston 132 to provide a measurement of vertical movement of slide 56. These vertical positions are collected by processor 142 as frame 12 traverses surface 102. The static and dynamic measurements collected by processor 142 can be stored in memory 144. As described above, the static and dynamic measurements can also be processed by processor 142 in accordance with a surface profiling scheme with the processed results being made available in a plain text version. An encrypted version of the processed results can also be made available by encryption generator 146.

An odometer 152 is coupled to wheel 18 to measure distance traveled for each rotation thereof. Odometer 152 will produce a signal at each rotation of wheel 18 that is essentially indicative of the distance traveled by wheel 18 across surface 102. A processor 154 (which could be incorporated with processor 142) coupled to odometer 152 is programmed with the afore-described predetermined distance $\Delta x$ and the number of revolutions of wheel 18 required to equal $\Delta x$. Each time $\Delta x$ is traversed by movable platform 110, a signal indicative of this fact is supplied to signaling device(s) 160 where one or more of a visual alarm device 162, an audible alarm device 164, and a tactile alarm device 166 are activated. Upon recognizing activation of one of these alarm devices, the user knows to stop movement of frame 12 so that a static inclination measurement by inclinometer 122 can be collected by data collector 140.

The advantages of the present invention are numerous. The system provides the means to collect surface profiling data measurements that can be used to reduce the inherent errors associated with surface profiling schemes.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for collecting measurements for use by a surface profiling processing scheme, said system comprising:

a movable platform;

an odometer coupled to said movable platform for measuring distance that said movable platform traverses during a measurement run on a surface wherein said measurement run is defined by starting and stopping positions on the surface that are spaced apart from one another;

first means mounted to said movable platform for generating a measurement of inclination of the surface where said movable platform is positioned when said movable platform is stationary thereon;

second means mounted to said movable platform for generating measurements of curvature of the surface as said movable platform traverses the surface;

third means mounted on said movable platform and coupled to said odometer for monitoring said distance that said movable platform traverses during said measurement run and for generating a signal each time said movable platform traverses a predetermined amount of distance during said measurement run, wherein said signal (i) is realized by at least one of a visual alarm, an audible alarm and a tactile alarm, and (ii) serves as an indication to stop said movable platform during said measurement run; and fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

2. A system as in claim 1 wherein said movable platform comprises:

a frame;

at least four supports coupled to said frame and contacting the surface wherein said frame is supported above the surface;

a first three of said at least four supports being arranged in a linear alignment that defines a direction of travel for said frame, and a remainder of said at least four supports being spaced apart from said linear alignment;

said first three defined by a front support, a rear support and a center support centered between said front support and said rear support;

said center support being a floating support capable of substantially vertical movement; and at least one of said front support, said rear support and said center support being a wheel configured to roll in said direction of travel.

3. A system as in claim 2 wherein said odometer is coupled to one of said front support, said rear support and said center support that is said wheel.

4. A system as in claim 2 wherein said first means is an inclinometer mounted on said frame, said inclinometer having an axis of sensitivity that is aligned parallel to said direction of travel.

5. A system as in claim 2 wherein said second means is a linear position transducer coupled to said center support for generating said measurements of curvature by measuring said substantially vertical movement of said center support as said movable platform traverses said surface during said measurement run.

6. A system as in claim 2 wherein all of said at least four supports are wheels.

7. A system as in claim 2 wherein said center support comprises a slidable support that slides on the surface.

8. A system as in claim 2 wherein each of said front support and said center support comprises a slidable support that slides on the surface.

9. A system as in claim 8 wherein said odometer is coupled to said rear support.

10. A system as in claim 1 further comprising means to pull said movable platform during said measurement run.

11. A system as in claim 1 further comprising fifth means coupled to said fourth means for processing said measurements of curvature and each said measurement of inclination in accordance with a surface profiling scheme to generate surface profile measurements.

12. A system as in claim 11 further comprising sixth means for encrypting said surface profile measurements.

13. A system for collecting measurements for use by a surface profiling processing scheme, said system comprising:
a movable platform;
first means mounted to said movable platform for generating a measurement of inclination of a surface where said movable platform is positioned when said movable platform is stationary thereon;
second means mounted to said movable platform for generating measurements of curvature of the surface as said movable platform traverses the surface;
third means mounted on said movable platform for monitoring distance that said movable platform traverses during a measurement run on the surface wherein said measurement run is defined by starting and stopping positions on the surface that are spaced apart from one another, said third means generating a signal each time said movable platform traverses a predetermined amount of distance during said measurement run wherein said signal (i) is realized by at least one of a visual alarm, an audible alarm and a tactile alarm and (ii) serves as an indication to stop said movable platform during said measurement run; and
fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

14. A system as in claim 13 wherein said movable platform comprises:
a frame;
at least four supports coupled to said frame and contacting the surface wherein said frame is supported above the surface;
a first three of said at least four supports being arranged in a linear alignment that defines a direction of travel for said frame, and a remainder of said at least four supports being spaced apart from said linear alignment;
said first three defined by a front support, a rear support and a center support centered between said front support and said rear support;
said center support being a floating support capable of substantially vertical movement; and
at least one of said front support, said rear support and said center support being a wheel configured to roll in said direction of travel.

15. A system as in claim 14 wherein said first means is an inclinometer mounted on said frame, said inclinometer having an axis of sensitivity that is aligned parallel to said direction of travel.

16. A system as in claim 14 wherein said second means is a linear position transducer coupled to said center support for generating said measurements of curvature by measuring said substantially vertical movement of said center support as said movable platform traverses said surface during said measurement run.

17. A system as in claim 14 wherein all of said at least four supports are wheels.

18. A system as in claim 14 wherein said center support comprises a slidable support that slides on the surface.

19. A system as in claim 14 wherein each of said front support and said center support comprises a slidable support that slides on the surface.

20. A system as in claim 14 further comprising fifth means coupled to said fourth means for processing said measurements of curvature and each said measurement of inclination in accordance with a surface profiling scheme to generate surface profile measurements.

21. A system as in claim 20 further comprising sixth means for encrypting said surface profile measurements.

22. A system as in claim 13 further comprising means to pull said movable platform during said measurement run.

23. A system for collecting measurements for use by a surface profiling processing scheme, said system comprising:
a movable platform that includes a frame and at least four supports coupled to said frame and contacting a surface wherein said frame is supported above the surface;
a first three of said at least four supports being arranged in a linear alignment that defines a direction of travel for said frame, and a remainder of said at least four supports being spaced apart from said linear alignment;
said first three defined by a front support, a rear support and a center support centered between said front support and said rear support;
said center support being a floating support capable of substantially vertical movement;
at least one of said front support, said rear support and said center support being a wheel configured to roll in said direction of travel;
an odometer coupled to one of said front support, said rear support and said center support that is said wheel, said odometer measuring distance that said movable platform traverses during a measurement run on the surface wherein said measurement run is defined by starting and stopping positions on the surface that are spaced apart from one another;
an inclinometer mounted on said frame, said inclinometer having an axis of sensitivity that is aligned parallel to said direction of travel, said inclinometer generating a measurement of inclination of the surface where said movable platform is positioned when said movable platform is stationary thereon;

a linear position sensor coupled to said center support for measuring said substantially vertical movement of said center support as said movable platform traverses said surface during said measurement run, wherein measurements of said substantially vertical movement are indicative of measurements of curvature of the surface;

a distance monitor mounted on said movable platform and coupled to said odometer for monitoring said distance that said movable platform traverses during said measurement run and for generating a signal each time said movable platform traverses a predetermined amount of distance during said measurement run, said distance monitor including means for outputting said signal as at least one of a visual alarm, an audible alarm and a tactile alarm wherein said signal serves as an indication to stop said movable platform during said measurement run; and a data collector coupled to said linear distance sensor and said distance monitor for collecting (i) said measurements of said substantially vertical movement while said movable platform traverses the surface during said measurement run, and (ii) said measurement of inclination at said starting position, said stopping position, and each time said movable platform is stopped during said measurement run following the generation of said signal.

24. A system as in claim 23 further comprising means to pull said movable platform during said measurement run.

25. A system as in claim 23 wherein all of said at least four supports are wheels.

26. A system as in claim 23 wherein said center support comprises a slidable support that slides on the surface.

27. A system as in claim 25 wherein each of said front support and said center support comprises a slidable support that slides on the surface.

28. A system as in claim 27 wherein said odometer is coupled to said rear support.

29. A system as in claim 23 wherein said data collector includes a processor for processing said measurements of curvature and each said measurement of inclination in accordance with a surface profiling scheme to generate surface profile measurements.

30. A system as in claim 29 further an encryption generator for encrypting said surface profile measurements.

31. A system for collecting measurements for use by a surface profiling processing scheme, said system comprising:

a movable platform having (i) a frame, (ii) at least four supports coupled to said frame and contacting the surface wherein said frame is supported above the surface, (iii) a first three of said at least four supports being arranged in a linear alignment that defines a direction of travel for said frame, and a remainder of said at least four supports being spaced apart from said linear alignment, (iv) said first three defined by a front support, a rear support and a center support centered between said front support and said rear support, (v) said center support being a floating slidable support that slides on the surface while being capable of substantially vertical movement, and (vi) at least one of said front support and said rear support being a wheel configured to roll in said direction of travel;

an odometer coupled to said movable platform for measuring distance that said movable platform traverses during a measurement run on a surface wherein said measurement run is defined by starting and stopping positions on the surface that are spaced apart from one another;

first means mounted to said movable platform for generating a measurement of inclination of the surface where said movable platform is positioned when said movable platform is stationary thereon;

second means mounted to said movable platform for generating measurements of curvature of the surface as said movable platform traverses the surface;

third means mounted on said movable platform and coupled to said odometer for monitoring said distance that said movable platform traverses during said measurement run and for generating a signal each time said movable platform traverses a predetermined amount of distance during said measurement run, wherein said signal serves as an indication to stop said movable platform during said measurement run; and fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

32. A system as in claim 31 wherein said first means is an inclinometer mounted on said frame, said inclinometer having an axis of sensitivity that is aligned parallel to said direction of travel.

33. A system as in claim 31 wherein said second means is a linear position transducer coupled to said center support for generating said measurements of curvature by measuring said substantially vertical movement of said center support as said movable platform traverses said surface during said measurement run.

34. A system as in claim 31 further comprising means to pull said movable platform during said measurement run.

35. A system as in claim 31 further comprising fifth means coupled to said fourth means for processing said measurements of curvature and each said measurement of inclination in accordance with a surface profiling scheme to generate surface profile measurements.

36. A system as in claim 35 further comprising sixth means for encrypting said surface profile measurements.

37. A system for collecting measurements for use by a surface profiling processing scheme, said system comprising:

a movable platform having (i) a frame, (ii) at least four supports coupled to said frame and contacting a surface wherein said frame is supported above the surface, (iii) a first three of said at least four supports being arranged in a linear alignment that defines a direction of travel for said frame, and a remainder of said at least four supports being spaced apart from said linear alignment, (iv) said first three defined by a front support, a rear support and a center support centered between said front support and said rear support, (v) said center support being a floating slidable support that slides on the surface while being capable of substantially vertical movement, and (vi) said front support being a slidable support and said rear support being a wheel configured to roll in said direction of travel;

an odometer coupled to said movable platform for measuring distance that said movable platform traverses during a measurement run on the surface wherein said measurement run is defined by starting and stopping positions on the surface that are spaced apart from one another;

first means mounted to said movable platform for generating a measurement of inclination of the surface where said movable platform is positioned when said movable platform is stationary thereon;

second means mounted to said movable platform for generating measurements of curvature of the surface as said movable platform traverses the surface;

third means mounted on said movable platform and coupled to said odometer for monitoring said distance that said movable platform traverses during said measurement run and for generating a signal each time said movable platform traverses a predetermined amount of distance during said measurement run, wherein said signal serves as an indication to stop said movable platform during said measurement run; and fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

38. A system as in claim 37 wherein said first means is an inclinometer mounted on said frame, said inclinometer having an axis of sensitivity that is aligned parallel to said direction of travel.

39. A system as in claim 37 wherein said second means is a linear position transducer coupled to said center support for generating said measurements of curvature by measuring said substantially vertical movement of said center support as said movable platform traverses said surface during said measurement run.

40. A system as in claim 37 further comprising means to pull said movable platform during said measurement run.

41. A system as in claim 37 further comprising fifth means coupled to said fourth means for processing said measurements of curvature and each said measurement of inclination in accordance with a surface profiling scheme to generate surface profile measurements.

42. A system as in claim 41 further comprising sixth means for encrypting said surface profile measurements.

43. A system for collecting measurements for use by a surface profiling processing scheme, said system comprising:

a movable platform having (i) a frame, (ii) at least four supports coupled to said frame and contacting a surface wherein said frame is supported above the surface, (iii) a first three of said at least four supports being arranged in a linear alignment that defines a direction of travel for said frame, and a remainder of said at least four supports being spaced apart from said linear alignment, (iv) said first three defined by a front support, a rear support and a center support centered between said front support and said rear support, (v) said center support being a floating slidable support that slides on the surface while being capable of substantially vertical movement, and (vi) at least one of said front support and said rear support being a wheel configured to roll in said direction of travel;

first means mounted to said movable platform for generating a measurement of inclination of the surface where said movable platform is positioned when said movable platform is stationary thereon;

second means mounted to said movable platform for generating measurements of curvature of the surface as said movable platform traverses the surface;

third means mounted on said movable platform for monitoring distance that said movable platform traverses during a measurement run on the surface wherein said measurement run is defined by starting and stopping positions on the surface that are spaced apart from one another, said third means generating a signal each time said movable platform traverses a predetermined amount of distance during said measurement run wherein said signal serves as an indication to stop said movable platform during said measurement run; and fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

44. A system as in claim 43 wherein said first means is an inclinometer mounted on said frame, said inclinometer having an axis of sensitivity that is aligned parallel to said direction of travel.

45. A system as in claim 43 wherein said second means is a linear position transducer coupled to said center support for generating said measurements of curvature by measuring said substantially vertical movement of said center support as said movable platform traverses said surface during said measurement run.

46. A system as in claim 43 further comprising means to pull said movable platform during said measurement run.

47. A system as in claim 43 further comprising fifth means coupled to said fourth means for processing said measurements of curvature and each said measurement of inclination in accordance with a surface profiling scheme to generate surface profile measurements.

48. A system as in claim 47 further comprising sixth means for encrypting said surface profile measurements.

49. A system for collecting measurements for use by a surface profiling processing scheme, said system comprising:

a movable platform having (i) a frame, (ii) at least four supports coupled to said frame and contacting a surface wherein said frame is supported above the surface, (iii) a first three of said at least four supports being arranged in a linear alignment that defines a direction of travel for said frame, and a remainder of said at least four supports being spaced apart from said linear alignment, (iv) said first three defined by a front support, a rear support and a center support centered between said front support and said rear support, (v) said center support being a floating slidable support that slides on the surface while being capable of substantially vertical movement, and (vi) said front support being a slidable support and said rear support being a wheel configured to roll in said direction of travel;

first means mounted to said movable platform for generating a measurement of inclination of the surface where said movable platform is positioned when said movable platform is stationary thereon;

second means mounted to said movable platform for generating measurements of curvature of the surface as said movable platform traverses the surface;

third means mounted on said movable platform for monitoring distance that said movable platform traverses during a measurement run on the surface wherein said measurement run is defined by starting and stopping positions on the surface that are spaced apart from one another, said third means generating a signal each time said movable platform traverses a predetermined amount of distance during said measurement run wherein said signal serves as an indication to stop said movable platform during said measurement run; and fourth means coupled to said first means and said second means for collecting (i) said measurements of curvature while said movable platform traverses the surface during said measurement run, and (ii) said measurement of inclination at said starting position, said stopping position, and each time said movable platform is stopped during said measurement run following the generation of said signal.

50. A system as in claim 49 wherein said first means is an inclinometer mounted on said frame, said inclinometer having an axis of sensitivity that is aligned parallel to said direction of travel.

51. A system as in claim 49 wherein said second means is a linear position transducer coupled to said center support for generating said measurements of curvature by measuring said substantially vertical movement of said center support as said movable platform traverses said surface during said measurement run.

52. A system as in claim 49 further comprising means to pull said movable platform during said measurement run.

53. A system as in claim 49 further comprising fifth means coupled to said fourth means for processing said measurements of curvature and each said measurement of inclination in accordance with a surface profiling scheme to generate surface profile measurements.

54. A system as in claim 53 further comprising sixth means for encrypting said surface profile measurements.

55. A system for collecting measurements for use by a surface profiling processing scheme, said system comprising:

a movable platform that includes a frame and at least four supports coupled to said frame and contacting a surface wherein said frame is supported above the surface;

a first three of said at least four supports being arranged in a linear alignment that defines a direction of travel for said frame, and a remainder of said at least four supports being spaced apart from said linear alignment;

said first three defined by a front support, a rear support and a center support centered between said front support and said rear support;

said center support being a floating slidable support that slides on the surface while being capable of substantially vertical movement;

at least one of said front support and said rear support being a wheel configured to roll in said direction of travel;

an odometer coupled to one of said front support, said rear support and said center support that is said wheel, said odometer measuring distance that said movable platform traverses during a measurement run on the surface wherein said measurement run is defined by starting and stopping positions on the surface that are spaced apart from one another;

an inclinometer mounted on said frame, said inclinometer having an axis of sensitivity that is aligned parallel to said direction of travel, said inclinometer generating a measurement of inclination of the surface where said movable platform is positioned when said movable platform is stationary thereon;

a linear position sensor coupled to said center support for measuring said substantially vertical movement of said center support as said movable platform traverses said surface during said measurement run, wherein measurements of said substantially vertical movement are indicative of measurements of curvature of the surface;

a distance monitor mounted on said movable platform and coupled to said odometer for monitoring said distance that said movable platform traverses during said measurement run and for generating a signal each time said movable platform traverses a predetermined amount of distance during said measurement run, wherein said signal serves as an indication to stop said movable platform during said measurement run; and a data collector coupled to said linear distance sensor and said distance monitor for collecting (i) said measurements of said substantially vertical movement while said movable platform traverses the surface during said measurement run, and (ii) said measurement of inclination at said starting position, said stopping position, and each time said movable platform is stopped during said measurement run following the generation of said signal.

56. A system as in claim 55 further comprising means to pull said movable platform during said measurement run.

57. A system as in claim 55 wherein said data collector includes a processor for processing said measurements of curvature and each said measurement of inclination in accordance with a surface profiling scheme to generate surface profile measurements.

58. A system as in claim 57 further an encryption generator for encrypting said surface profile measurements.

59. A system for collecting measurements for use by a surface profiling processing scheme, said system comprising:

a movable platform that includes a frame and at least four supports coupled to said frame and contacting a surface wherein said frame is supported above the surface;

a first three of said at least four supports being arranged in a linear alignment that defines a direction of travel for said frame, and a remainder of said at least four supports being spaced apart from said linear alignment;

said first three defined by a front support, a rear support and a center support centered between said front support and said rear support;

said center support being a floating slidable support that slides on the surface while being capable of substantially vertical movement;

said front support being a slidable support and said rear support being a wheel configured to roll in said direction of travel;

an odometer coupled to one of said front support, said rear support and said center support that is said wheel, said odometer measuring distance that said movable platform traverses during a measurement run on the surface wherein said measurement run is defined by starting and stopping positions on the surface that are spaced apart from one another;

an inclinometer mounted on said frame, said inclinometer having an axis of sensitivity that is aligned parallel to said direction of travel, said inclinometer generating a measurement of inclination of the surface where said movable platform is positioned when said movable platform is stationary thereon;

a linear position sensor coupled to said center support for measuring said substantially vertical movement of said center support as said movable platform traverses said surface during said measurement run, wherein measurements of said substantially vertical movement are indicative of measurements of curvature of the surface;

a distance monitor mounted on said movable platform and coupled to said odometer for monitoring said distance that said movable platform traverses during said measurement run and for generating a signal each time said movable platform traverses a predetermined amount of distance during said measurement run, wherein said signal serves as an indication to stop said movable platform during said measurement run; and a data collector coupled to said linear distance sensor and said distance monitor for collecting (i) said measurements of said substantially vertical movement while said movable platform traverses the surface during said measurement run, and (ii) said measurement of inclination at said starting position, said stopping position, and each time said movable platform is stopped during said measurement run following the generation of said signal.

60. A system as in claim 59 further comprising means to pull said movable platform during said measurement run.

61. A system as in claim 59 wherein said data collector includes a processor for processing said measurements of curvature and each said measurement of inclination in accordance with a surface profiling scheme to generate surface profile measurements.

62. A system as in claim 61 further an encryption generator for encrypting said surface profile measurements.

* * * * *